July 26, 1932. H. D. BROWNING 1,869,301
VEHICLE CONTROL LEVER
Filed May 2, 1931
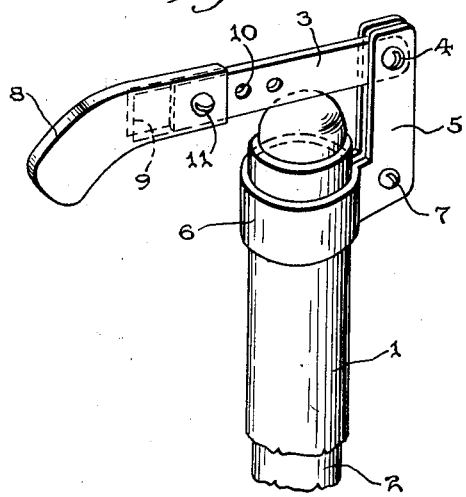
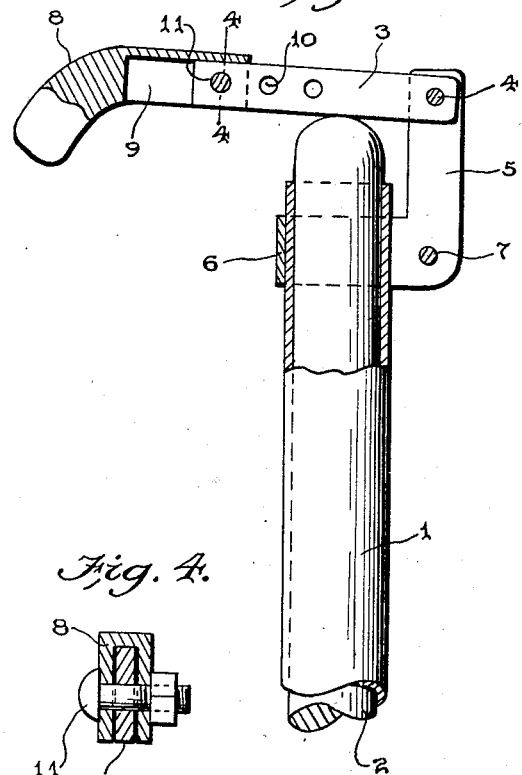
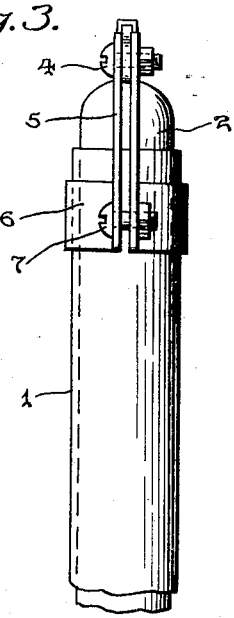
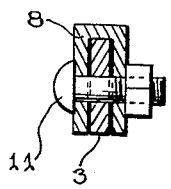
Inventor
Howard D. Browning,
By
Attorney Patented July 26, 1932

1,869,301

UNITED STATES PATENT OFFICE

HOWARD D. BROWNING, OF SOUTH KINGSTOWN, RHODE ISLAND

VEHICLE CONTROL LEVER

Application filed May 2, 1931. Serial No. 534,499.

This invention relates to vehicle control levers.

Vehicle brake and similar control levers for machinery are frequently not easy of operation because of the binding and friction encountered between the movable parts.

Therefore, the main feature of this invention is the provision of a lever which may be easily and readily operated at all times and under conditions which oftentimes preclude the easy manipulation of the usual lever.

A further purpose of the invention is to devise a lever which may be adjusted to the convenience and strength of the operator, so that it may be manipulated with the greatest facility from any angle.

The invention contemplates a handle which may be lengthened or shortened as desired, and quickly adjusted to any angle to suit the convenience of the driver or operator.

Other objects and advantages will be apparent as the nature of the invention is disclosed, reference being had to the accompanying drawing and following description in which corresponding and like parts are referred to and designated in the several views of the drawing by similar reference characters.

Referring to the drawing which illustrates an embodiment of the invention;—

Figure 1 is a detail perspective view of the upper end of a control lever illustrative of the invention.

Fig. 2 is a side view of the parts shown in Fig. 1, partly in section.

Fig. 3 is a view similar to Fig. 2 taken at a right angle thereto.

Fig. 4 is an enlarged detail sectional view on the line 4—4 of Fig. 2.

The lever is designated generally by the numeral 1 and a latch releasing rod 2 is associated therewith. For convenience, it is preferred to form the lever 1 from a length of tubing and to mount the latch releasing rod 2 therein. The rod 2 projects some distance beyond the end of the lever 1 and the extremity is rounded to minimize the contact of the hand lever 3 therewith.

The hand lever is adjustable with reference to position and length and is pivotally mounted at 4 on the upper end of a standard 5 which is secured to the lever 1 by means of a clamp 6. The parts 5 and 6 constitute a mount for the hand lever and this mount may be secured in the desired position by means of a bolt 7 which connects the separated parts of the blank or strip from which the mount is constructed.

The clamp 6 encircles the upper end of the lever 1 and the standard 5 constitutes extensions of the mount which project upwardly a distance to clear the end of the rod 2.

A grip 8 is adjustably connected with the hand lever 3 and admits of lengthening and shortening the hand lever as may be required. The outer portion of the grip 8 is curved and the end portion receiving the lever 3 is recessed, as indicated at 9. The hand lever 3 is provided in its length with a plurality of openings 10 through any one of which a bolt or similar fastening 11 is adapted to be passed for securing the grip to the lever in the required adjusted position. The outer end of the hand lever 3 obtains a snug fit within the recess 9, thereby admitting of a single fastening 11 being advantageously utilized for securing the grip 8 thereto in the required adjusted position.

In the preferred structure illustrated, the latch releasing rod 2 is mounted within the lever 1 and is housed and directed in its movements thereby. Upon loosening the bolt 7 the hand lever mount may be angularly adjusted with reference to the control lever 1 and when positioned, may be secured by retightening the bolt or fastening 7, as will be readily comprehended.

In this manner provision is had for angular adjustment of the hand lever. The length of the hand lever may be adjusted to suit the strength of the driver or operator, and this adjustment may be readily effected by removing the fastening 11 and sliding the grip 8 upon the lever 3. The grip is made secure in the desired adjusted position by replacing the fastening 11 through a selected opening 10 and corresponding openings formed in opposite sides of the grip 8 bordering upon the recess 9. Pressure exerted upon the grip 8 effects a depression of the rod 2 whereby to release the latch or operate the other part to be actuated by means of the rod 2 preliminary to shifting the lever 1 to the required position.

What I claim is:

The combination with a control lever and a latch releasing rod therein and projecting beyond the end thereof, of a mount comprising a clamp encircling the lever adjacent its upper end and having spaced similarly formed integral standards extending upwardly therefrom beyond the extremity of the releasing rod and to one side thereof, a bolt connecting the said standards adjacent the encircling portion of the clamp to secure the latter upon the lever in its desired adjusted position, a hand lever provided with openings at one end and pivoted at its other end between the upper ends of the standards and extending across and over the projecting end of the releasing rod, and a curved adjustable grip having its inner end recessed and provided on both sides of the recess with aligned openings to engage the end of the hand lever having the openings therein, the openings in the grip being arranged to register with the openings in the hand lever thereby enabling the grip to be secured in its desired leverage adjusted position by passing retaining means through the openings in the grip and the end of the handle.

In testimony whereof, I have hereunto set my hand, this 9th day of April, 1931.

HOWARD D. BROWNING.